United States Patent
Nozu et al.

(10) Patent No.: US 11,084,375 B2
(45) Date of Patent: Aug. 10, 2021

(54) DRIVE FORCE TRANSMISSION APPARATUS

(71) Applicant: JTEKT CORPORATION, Osaka (JP)

(72) Inventors: Tomohiro Nozu, Anjo (JP); Tsutomu Matsumoto, Anjo (JP); Tomoaki Kato, Kariya (JP); Akiyoshi Kakita, Toyota (JP); Kenta Taniguchi, Anjo (JP)

(73) Assignee: JTEKT CORPORATION, Osaka (JP)

( * ) Notice: Subject to any disclaimer, the term of this patent is extended or adjusted under 35 U.S.C. 154(b) by 139 days.

(21) Appl. No.: 16/001,373

(22) Filed: Jun. 6, 2018

(65) Prior Publication Data

US 2018/0361851 A1 Dec. 20, 2018

(30) Foreign Application Priority Data

Jun. 14, 2017 (JP) .............................. JP2017-117060

(51) Int. Cl.
*B60K 23/08* (2006.01)
*B60K 17/35* (2006.01)
(Continued)

(52) U.S. Cl.
CPC ........ *B60K 23/0808* (2013.01); *B60K 17/344* (2013.01); *B60K 17/3515* (2013.01); *F16D 13/52* (2013.01); *F16D 25/082* (2013.01); *F16D 48/06* (2013.01); *B60K 2023/0858* (2013.01); *B60K 2023/0883* (2013.01); *F16D 2500/10431* (2013.01); *F16D 2500/3122* (2013.01); *F16D 2500/3125* (2013.01); *F16D 2500/3127* (2013.01)

(58) Field of Classification Search
CPC .............. B60K 23/0808; B60K 17/344; B60K 17/3515; F16D 13/52; F16D 25/082; F16D 48/06
USPC ......................................................... 180/247
See application file for complete search history.

(56) References Cited

U.S. PATENT DOCUMENTS 5,323,871 A * 6/1994 Wilson ................. B60K 17/344
180/197
5,695,022 A * 12/1997 Zalewski ............. B60K 17/344
180/197
(Continued)

FOREIGN PATENT DOCUMENTS

JP          2013-76460          4/2013

*Primary Examiner* — Jacob D Knutson
(74) *Attorney, Agent, or Firm* — Oblon, McClelland, Maier & Neustadt, L.L.P.

(57) ABSTRACT

A drive force transmission apparatus is mountable on a four-wheel drive vehicle switchable between a four-wheel drive mode that transmits a drive force of an engine to front wheels and rear wheels, and a two-wheel drive mode that transmits the drive force to only the front wheels. The drive force transmission apparatus allows adjustment of the drive force to the rear wheels, and includes a multi-plate clutch, a piston for axially pressing the multi-plate clutch, an actuator for axially moving the piston, and a control unit for controlling the actuator. Upon satisfaction of a predetermined condition that indicates a high probability of the vehicle needing to be switched from the two-wheel drive mode to the four-wheel drive mode, the control unit causes the actuator to displace the piston by a predetermined amount with respect to an initial position of the piston toward the multi-plate clutch.

6 Claims, 13 Drawing Sheets

(51) Int. Cl.
  B60K 17/344  (2006.01)
  F16D 13/52  (2006.01)
  F16D 48/06  (2006.01)
  F16D 25/08  (2006.01)

(56) References Cited

U.S. PATENT DOCUMENTS

| | | | | |
|---|---|---|---|---|
| 6,079,535 A | * | 6/2000 | Mueller | B60K 17/34 180/247 |
| 2015/0038295 A1 | * | 2/2015 | Yoshimura | F16D 13/52 477/86 |
| 2016/0025156 A1 | * | 1/2016 | Pritchard | F16D 13/69 192/70.23 |
| 2016/0252141 A1 | * | 9/2016 | Mordukhovich | F16D 13/46 192/70.21 |
| 2016/0280064 A1 | * | 9/2016 | Nozu | B60K 17/34 |
| 2017/0087985 A1 | * | 3/2017 | Imafuku | B60K 17/3467 |
| 2017/0299046 A1 | * | 10/2017 | Reth | F16H 57/0423 |
| 2018/0099563 A1 | * | 4/2018 | Nozu | B60K 23/0808 |
| 2018/0100569 A1 | * | 4/2018 | Imafuku | B60K 17/02 |
| 2018/0111479 A1 | * | 4/2018 | Grutter | B60K 17/348 |
| 2018/0229727 A1 | * | 8/2018 | Kelly | F16H 63/42 |

* cited by examiner

DRIVE FORCE TRANSMISSION APPARATUS

INCORPORATION BY REFERENCE

The disclosure of Japanese Patent Application No. 2017-117060 filed on Jun. 14, 2017 including the specification, drawings and abstract, is incorporated herein by reference in its entirety.

BACKGROUND OF THE INVENTION

1. Field of the Invention

The invention relates to a drive force transmission apparatus used in four-wheel drive vehicles that are switchable between a four-wheel drive mode and a two-wheel drive mode.

2. Description of Related Art

There are four-wheel drive vehicles switchable between a four-wheel drive mode that transmits a drive force of a drive source to main drive wheels and auxiliary drive wheels, and a two-wheel drive mode that transmits the drive force to only the main drive wheels. Such four-wheel drive vehicles use a drive force transmission apparatus that adjusts the drive force transmitted to the auxiliary drive wheels. Some types of drive force transmission apparatuses include a multi-plate clutch, a pressing member, and an actuator. The multi-plate clutch has multiple clutch plates and is supplied with lubricating oil that lubricates frictional sliding between the clutch plates. The pressing member presses the multi-plate clutch. The actuator moves the pressing member in an axial direction.

One concern with such drive force transmission apparatuses is that if clearances between the clutch plates in a non-operating state are set smaller, drag torque due to the viscosity of lubricating oil increases. On the other hand, if the clearances between the clutch plates are set larger, the distance that the pressing member needs to move increases, so that responsiveness is degraded. A drive force transmission apparatus disclosed in Japanese Patent Application Publication No. 2013-76460 (JP 2013-76460 A) has first and second pressing force application mechanisms to improve responsiveness and to suppress drag torque. The first pressing force application mechanism includes a main piston that applies a first pressing force to a multi-plate clutch. The second pressing force application mechanism includes an auxiliary piston that starts operating before the first pressing force application mechanism and that applies a second pressing force to the main piston so as to reduce clearances between clutch plates of the multi-plate clutch.

The drive force transmission apparatus disclosed in JP 2013-76460 A makes it possible to improve responsiveness while suppressing drag torque of the multi-plate clutch. However, the addition of the first and second pressing force application mechanisms complicates the apparatus structure, thus increasing the apparatus size and cost.

SUMMARY OF THE INVENTION

A purpose of the invention is to provide a drive force transmission apparatus that enables switching from a two-wheel drive mode to a four-wheel drive mode quickly when the switching becomes necessary, while suppressing an increase in the apparatus size and cost.

An aspect of the invention provides a drive force transmission apparatus that is mountable on a four-wheel drive vehicle switchable between a four-wheel drive mode that transmits a drive force of a drive source to main drive wheels and auxiliary drive wheels, and a two-wheel drive mode that transmits the drive force to only the main drive wheels. The drive force transmission apparatus allows adjustment of the drive force to the auxiliary drive wheels. The drive force transmission apparatus includes a multi-plate clutch, a pressing member that presses the multi-plate clutch in an axial direction, an actuator that moves the pressing member in the axial direction, and a control unit that controls the actuator. When a predetermined condition is satisfied with the four-wheel drive vehicle in the two-wheel drive mode, the control unit causes the actuator to displace the pressing member by a predetermined amount with respect to an initial position of the pressing member toward the multi-plate clutch. The satisfaction of the predetermined condition indicates a high probability of the four-wheel drive vehicle needing to be switched to the four-wheel drive mode.

According to the above aspect, the drive force transmission apparatus enables quick switching from the two-wheel drive mode to the four-wheel drive mode, while suppressing an increase in the apparatus size and cost.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
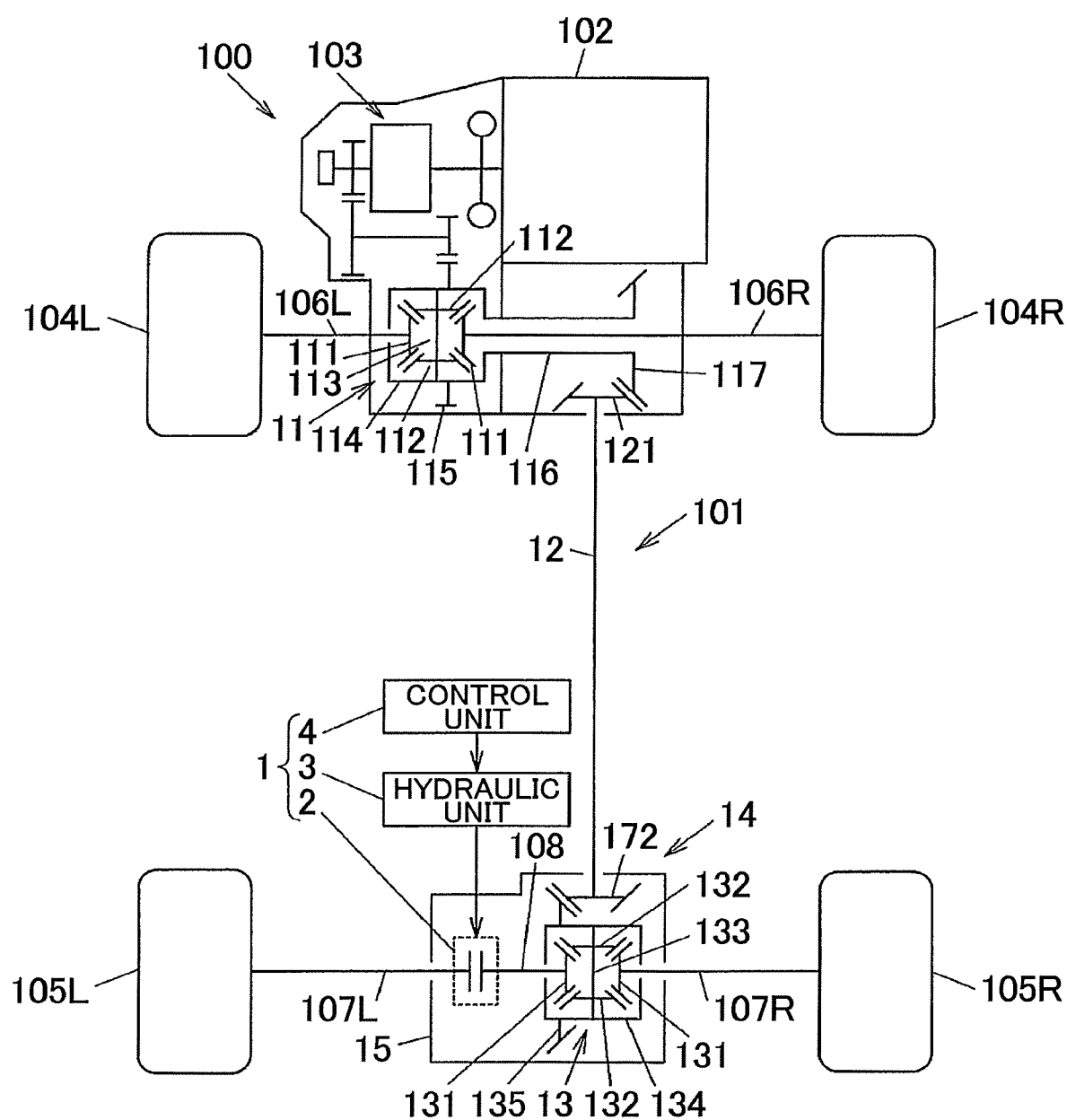
FIG. 1 is a schematic diagram illustrating the structure of a four-wheel drive vehicle equipped with a drive force transmission apparatus according to a first embodiment of the invention.

A first embodiment of the invention is described with reference to FIGS. 1 to 7. FIG. 1 is a schematic diagram illustrating the structure of a four-wheel drive vehicle 100 equipped with a drive force transmission apparatus 1 according to the first embodiment.

The four-wheel drive vehicle 100 includes the following: an engine 102 as a drive source for generating a drive force that the four-wheel drive vehicle 100 uses to travel; a transmission 103; right and left front wheels 104R and 104L as a pair of main drive wheels; right and left rear wheels 105R and 105L as a pair of auxiliary drive wheels; and a drive force transmission system 101 that selectively transmits the drive force of the engine 102 to the front wheels 104R and 104L and the rear wheels 105R and 105L. The four-wheel drive vehicle 100 is switchable between a four-wheel drive mode and a two-wheel drive mode. The four-wheel drive mode transmits the drive force of the engine 102 to the front wheels 104R and 104L, and also the rear wheels 105R and 105L. The two-wheel drive mode transmits the drive force of the engine 102 to only the front wheels 104R and 104L. Throughout the first embodiment, the notations "R" and "L" in reference numerals are respectively used to denote the right side and the left side of the four-wheel drive vehicle 100.

The drive force transmission system 101 includes the drive force transmission apparatus 1, a front differential 11, a propeller shaft 12, a rear differential 13, front drive shafts 106R and 106L, and rear drive shafts 107R and 107L. The drive force of the engine 102 is always transmitted to the front wheels 104R and 104L. The drive force of the engine 102 is transmitted to the rear wheels 105R and 105L through a rear drive force distribution mechanism 14 that includes the rear differential 13 and a clutch unit 2 of the drive force transmission apparatus 1. The drive force distribution mechanism 14 allows the drive force of the engine 102 to be selectively and differentially distributed to the right and left rear wheels 105R and 105L.

The front differential 11 includes the followings: a pair of side gears 111 each coupled to a corresponding one of the front drive shafts 106R and 106L; a pair of pinion gears 112 that mesh with the pair of side gears 111 with their gear axes perpendicular to each other; a pinion gear shaft 113 that supports the pair of pinion gears 112; a front differential case 114 that houses the pair of side gears 111, the pair of pinion gears 112, and the pinion gear shaft 113; and a ring gear 115 fixed to the outside of the front differential case 114. The drive force of the engine 102 is changed in speed by the transmission 103 and is then input to the front differential case 114 through the ring gear 115.

The propeller shaft 12 receives the torque of the engine 102 through the front differential case 114 and transmits the torque to the drive force distribution mechanism 14. A front end of the propeller shaft 12 is provided with a pinion gear 121. The pinion gear 121 is in mesh with a ring gear 117 that is coupled and fixed by a cylindrical portion 116 to the front differential case 114.

Like the front differential 11, the rear differential 13 includes a pair of side gears 131, a pair of pinion gears 132, a pinion gear shaft 133, a rear differential case 134, and a ring gear 135. One of the pair of side gears 131 is coupled to the drive shaft 107R and is not rotatable relative to the drive shaft 107R. The other of the pair of side gears 131 is coupled to an intermediate shaft 108 and is not rotatable relative to the intermediate shaft 108.

The clutch unit 2 of the drive force transmission apparatus 1 is located between the intermediate shaft 108 and the drive shaft 107L. The clutch unit 2 allows adjustments of the drive force that is transmitted from the intermediate shaft 108 to the drive shaft 107L. As much drive force as the clutch unit 2 transmits is transmitted to the drive shaft 107R through the rear differential 13. When the four-wheel drive vehicle 100 travels in a disengaged state where the clutch unit 2 does not transmit the drive force, the pair of pinion gears 132 spin idly so that no drive force is transmitted to the drive shafts 107R and 107L.

The drive force transmission apparatus 1 includes the clutch unit 2, a hydraulic unit 3, and a control unit 4 that controls the hydraulic unit 3. Details of the drive force transmission apparatus 1 are described later.

Figure 2:
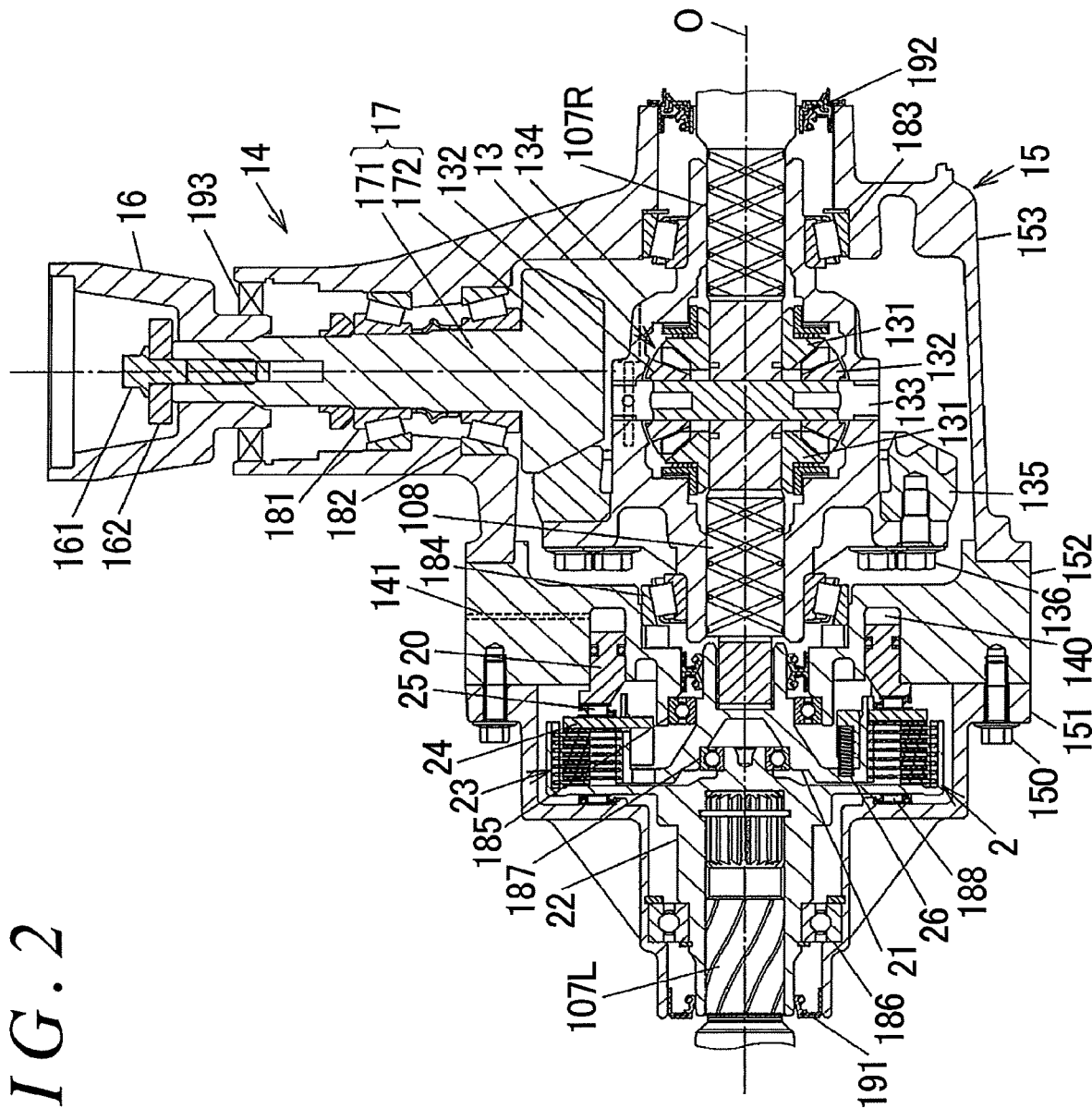
FIG. 2 is a cross-sectional view illustrating an example of the structure of a drive force distribution mechanism.
Figure 3:
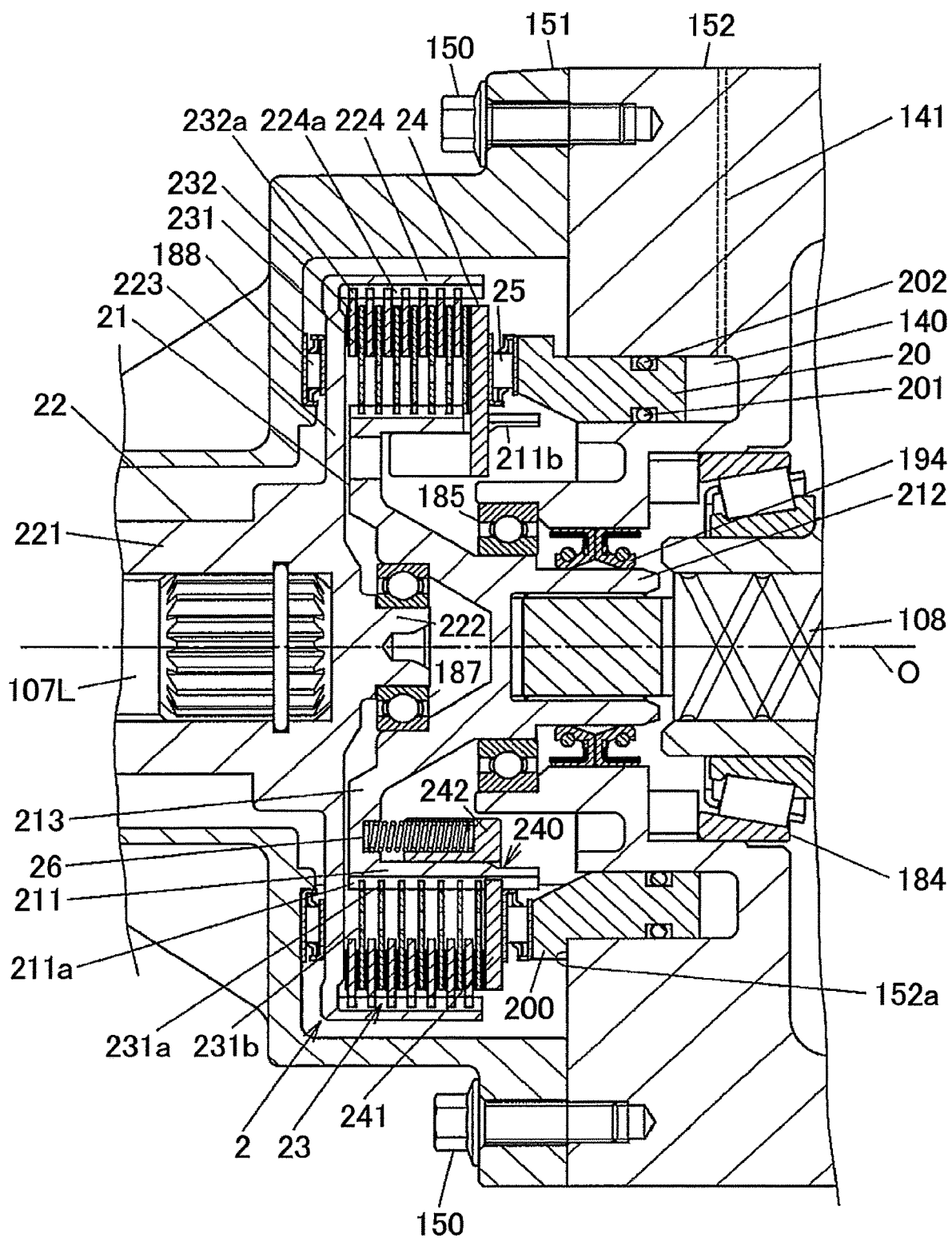
FIG. 3 is a partially enlarged view of FIG. 2.

FIG. 2 is a cross-sectional view illustrating an example of the structure of the drive force distribution mechanism 14. FIG. 3 is a partially enlarged view of FIG. 2.

The drive force distribution mechanism 14 includes the following: the rear differential 13; the clutch unit 2; a differential carrier 15 supported on a vehicle body; a coupling member 16 that the propeller shaft 12 is coupled to; a pinion gear shaft 17 that rotates together with the coupling member 16; and the intermediate shaft 108.

The coupling member 16 and the pinion gear shaft 17 are coupled together by a bolt 161 and a washer 162. The pinion gear shaft 17 includes a shaft portion 171 and a gear portion 172. The shaft portion 171 is supported by a pair of tapered roller bearings 181 and 182 such that the shaft portion 171 is rotatable. The gear portion 172 is in mesh with the ring gear 135. The ring gear 135 is fixed by multiple bolts 136 to the rear differential case 134 and is thus rotatable together with the rear differential case 134. The rear differential case 134 is rotatably supported on the differential carrier 15 by a pair of tapered roller bearings 183 and 184.

The differential carrier 15 includes the following: a first carrier member 151 that houses the clutch unit 2; a third carrier member 153 that houses the rear differential 13 and the pinion gear shaft 17; and a second carrier member 152 that is located between the first carrier member 151 and the third carrier member 153. The first carrier member 151 and the second carrier member 152 are bolted together. The second carrier member 152 and the third carrier member 153 are bolted together. For example, as illustrated in FIGS. 2 and 3, the first carrier member 151 and the second carrier member 152 are coupled together by multiple bolts 150.

The first carrier member 151 houses one end of the drive shaft 107L. The third carrier member 153 houses one end of the drive shaft 107R. A sealing member 191 fits in an opening of the first carrier member 151 that the drive shaft 107L is inserted through. A sealing member 192 fits in an opening of the third carrier member 153 that the drive shaft 107R is inserted through. The third carrier member 153 houses one end of the coupling member 16. A sealing member 193 is located between the coupling member 16 and the third carrier member 153.

The clutch unit 2 includes the following: a piston 20 that serves as a pressing member and that is moved by the pressure of hydraulic oil (a hydraulic fluid) supplied from the hydraulic unit 3; a clutch hub 21 that rotates together with the intermediate shaft 108; a clutch drum 22 that rotates together with the drive shaft 107L; a multi-plate clutch 23 that is located between the clutch hub 21 and the clutch drum 22; a pressure plate 24 and a thrust roller bearing 25 that are located between the piston 20 and the multi-plate clutch 23; and return springs 26 that are located between the clutch hub 21 and the pressure plate 24. The clutch hub 21 and the clutch drum 22 share an axis O of rotation and are rotatable relative to each other on the rotation axis O.

As illustrated in FIG. 3, the multi-plate clutch 23 includes the following: multiple inner clutch plates 231 that rotate together with the clutch hub 21; and multiple outer clutch plates 232 that rotate together with the clutch drum 22. Frictional sliding between the inner clutch plates 231 and the outer clutch plates 232 is lubricated by lubricating oil (not illustrated). The inner clutch plates 231 alternate with the outer clutch plates 232 in the axial direction.

When the multi-plate clutch 23 receives a pressing force from the piston 20 through the pressure plate 24 and the thrust roller bearing 25, a frictional force is generated between the inner clutch plates 231 and the outer clutch plates 232. The frictional force transmits a rotational force between the clutch hub 21 and the clutch drum 22. The axial movement of the piston 20 along the rotation axis O presses the multi-plate clutch 23 in the axial direction.

The clutch hub 21 integrally includes a cylindrical portion 211, a bottomed cylindrical coupling portion 212, and a connecting portion 213. The cylindrical portion 211 has an outer circumferential surface provided with a spline engagement portion 211a having multiple spline projections extending in the axial direction. The coupling portion 212 is smaller in diameter than the cylindrical portion 211 and is splined to the intermediate shaft 108. The connecting portion 213 connects the cylindrical portion 211 and the coupling portion 212. A sealing member 194 that is supported by the second carrier member 152 is in sliding contact with the outer circumferential surface of the coupling portion 212. The sealing member 194 forms a fluid tight seal for separating a space that houses the clutch unit 2 from a space that houses the rear differential 13.

The pressure plate 24 has an insertion opening 240 through which a projection 211b formed at an end of the cylindrical portion 211 of the clutch hub 21 is inserted. The pressure plate 24 is not rotatable relative to the clutch hub 21 and is movable in the axial direction relative to the clutch hub 21. The pressure plate 24 includes the following: a pressing portion 241 that is located radially outside the cylindrical portion 211 of the clutch hub 21 and that presses the multi-plate clutch 23; and an inner wall portion 242 located radially inside the cylindrical portion 211. The insertion opening 240 is formed between the pressing portion 241 and the inner wall portion 242. The return springs 26 are located between the inner wall portion 242 of the pressure plate 24 and the connecting portion 213 of the clutch hub 21 while being compressed in the axial direction. In FIGS. 2 and 3, one of the return springs 26 is illustrated. The return springs 26 are coil springs and bias the pressure plate 24 toward the piston 20.

As illustrated in FIG. 3, the clutch drum 22 integrally includes the following: a coupling portion 221 that the drive shaft 107L is coupled to; a boss portion 222 protruding in the axial direction from an end of the coupling portion 221 that faces the clutch hub 21; an annular wall portion 223 extending radially outward from the coupling portion 221; and a cylindrical portion 224 extending in the axial direction from a radially outer end of the wall portion 223.

The multi-plate clutch 23 is located between the cylindrical portion 211 of the clutch hub 21 and the cylindrical portion 224 of the clutch drum 22. Each of the inner clutch plates 231 has an inner edge provided with multiple projections 231a that engage with the spline engagement portion 211a of the cylindrical portion 211 of the clutch hub 21. Thus, the inner clutch plates 231 are coupled to the clutch hub 21 such that the inner clutch plates 231 are movable in the axial direction relative to the clutch hub 21 and are not rotatable relative to the clutch hub 21. Each of the outer clutch plates 232 has an outer edge provided with multiple projections 232a that engage with a spline engagement portion 224a formed on the inner circumferential surface of the cylindrical portion 224 of the clutch drum 22. Thus, the outer clutch plates 232 are coupled to the clutch drum 22 such that the outer clutch plates 232 are movable in the axial direction relative to the clutch drum 22 and are not rotatable relative to the clutch drum 22.

The clutch hub 21 is supported by a ball bearing 185 that is attached to the second carrier member 152. The clutch drum 22 is supported by a ball bearing 186 that is located between the coupling portion 221 and the first carrier member 151. A ball bearing 187 is located between the clutch hub 21 and the outer circumferential surface of the boss portion 222 of the clutch drum 22. A thrust roller bearing 188 is located between the wall portion 223 of the clutch drum 22 and the inner surface of the first carrier member 151.

The second carrier member 152 has an annular cylinder chamber 140 and a hydraulic oil supply hole 141. The cylinder chamber 140 is supplied, through the hydraulic oil supply hole 141, with hydraulic oil that applies hydraulic pressure to the piston 20 so as to move the piston 20 toward the multi-plate clutch 23. The cylinder chamber 140 is circular ring-shaped and has a central axis that coincides with the rotation axis O.

The cylinder chamber 140 is supplied, through the hydraulic oil supply hole 141, with the hydraulic oil from the hydraulic unit 3. The piston 20 is reciprocatable in the axial direction with its axial end partially remaining within the cylinder chamber 140. The piston 20 presses the multi-plate clutch 23 using the hydraulic pressure of the hydraulic oil supplied to the cylinder chamber 140, thereby bringing the inner clutch plates 231 and the outer clutch plates 232 in frictional contact with each other.

When the pressure of the hydraulic oil in the cylinder chamber 140 falls, the piston 20 moves toward the bottom of the cylinder chamber 140 by receiving the biasing force of the return springs 26 through the pressure plate 24, thus forming a distance between the multi-plate clutch 23. An O-ring 201 is held in a circumferential groove formed in the inner circumferential surface of the piston 20. An O-ring 202 is held in a circumferential groove formed in the outer circumferential surface of the piston 20. The O-rings 201 and 202 separate the hydraulic oil used to move the piston 20 from the lubricating oil used to lubricate the multi-plate clutch 23 so as not to allow these oils to mix with each other. The axial position of the piston 20 is where the pressure of the hydraulic oil in the cylinder chamber 140 that the piston 20 receives balances with the sum of the biasing force of the return springs 26 and the reaction force from the multi-plate clutch 23 that the piston 20 receives.

The piston 20 has an engagement protrusion 200 that is located outside the cylinder chamber 140 and that protrudes radially outward. When the pressure in the cylinder chamber 140 is low, the biasing force of the return springs 26 moves the piston 20 and brings the engagement protrusion 200 into abutment with an engagement surface 152a of the second carrier member 152 that is located around an opening of the cylinder chamber 140. The position of the piston 20 when the engagement protrusion 200 abuts with the engagement surface 152a of the second carrier member 152 is hereinafter referred to as initial position. In FIGS. 2 and 3, a lower area below the rotation axis O illustrates a state where the piston 20 is in the initial position.

Figure 4A:
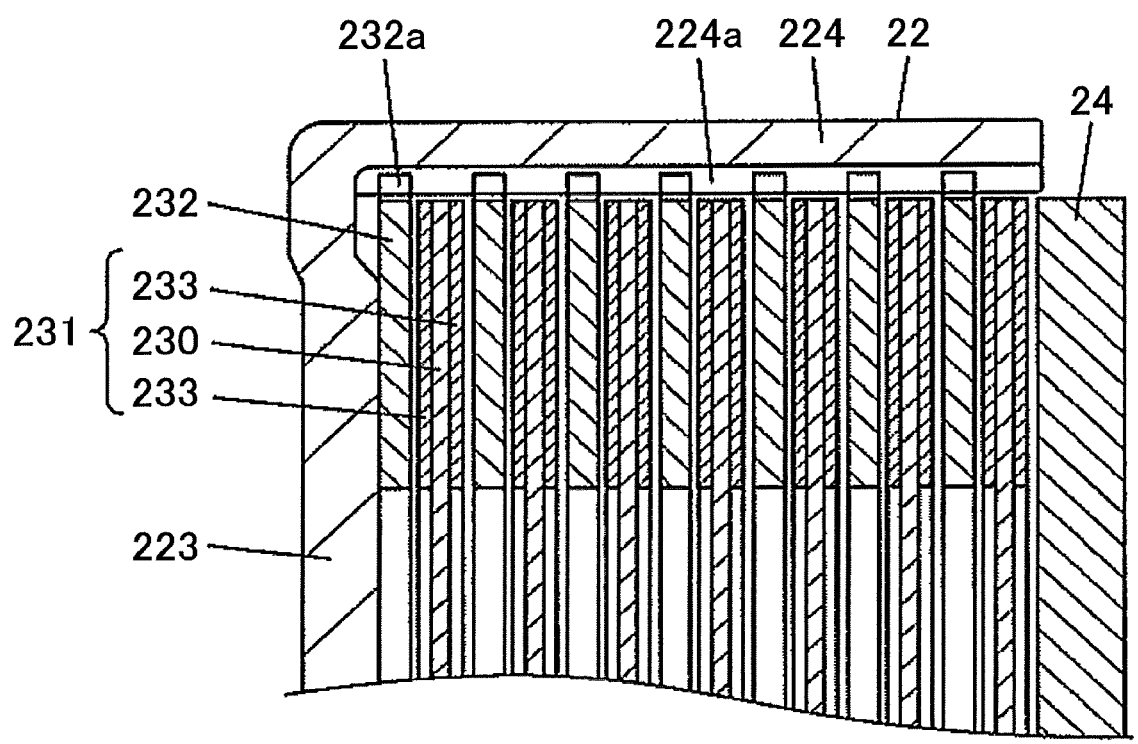
FIGS. 4A to 4C are enlarged views partially illustrating a multi-plate clutch and its surrounding area.
Figure 4B:
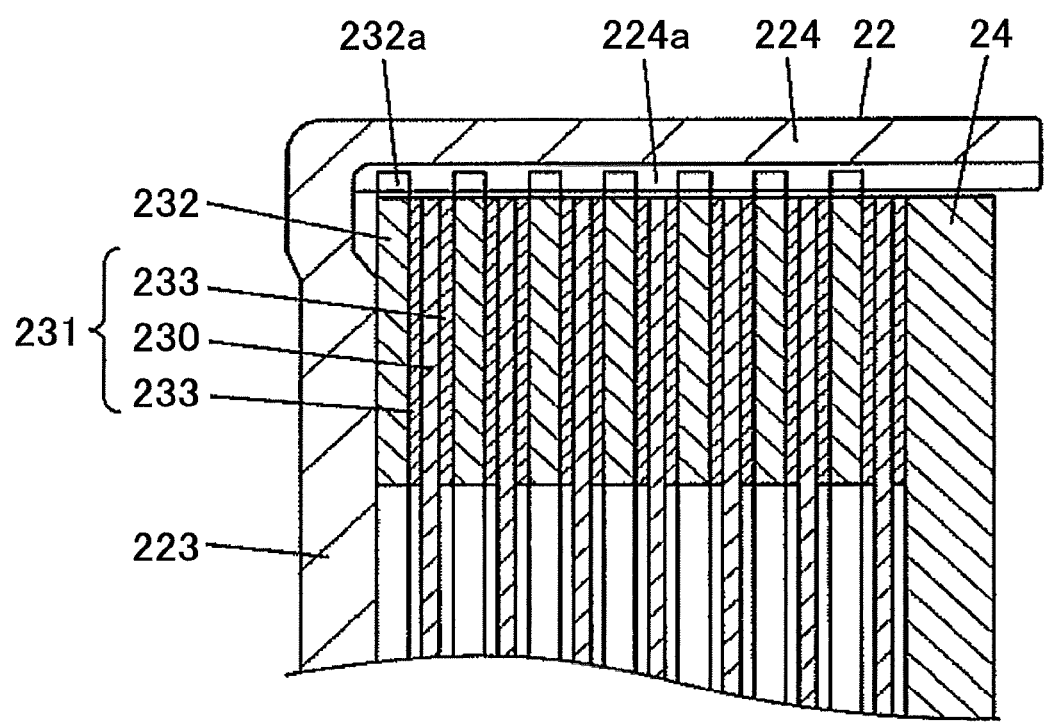
Figure 4C:
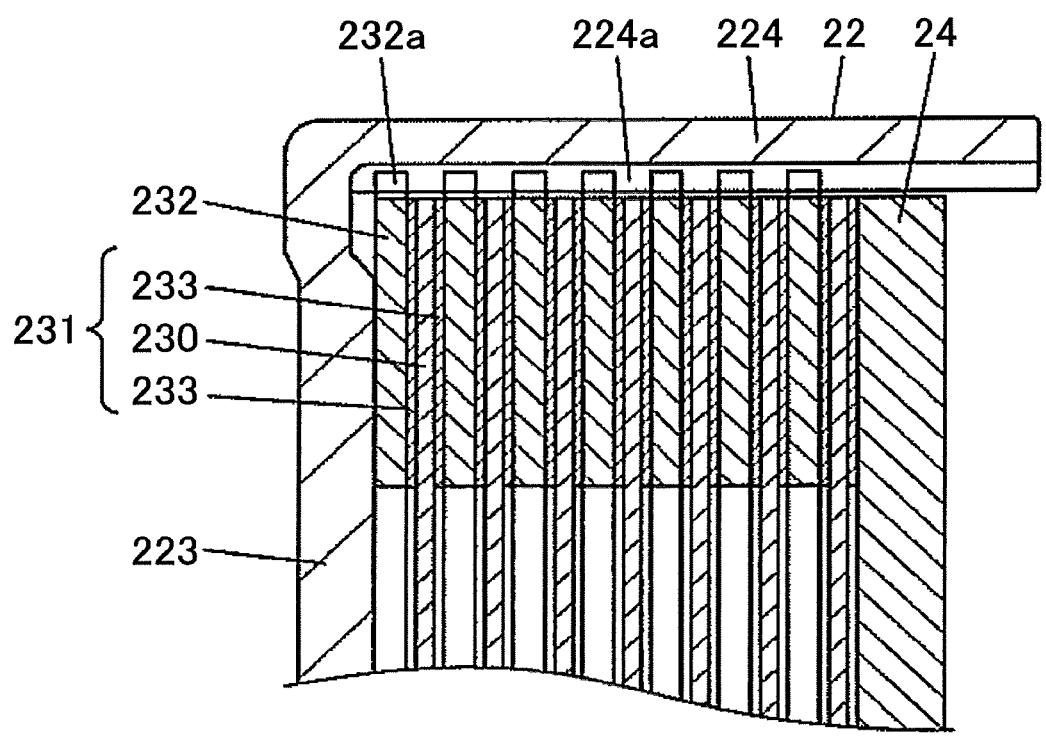

FIGS. 4A to 4C are enlarged views partially illustrating the multi-plate clutch 23 and its surrounding area. FIG. 4A shows a state where the piston 20 is in the initial position. FIG. 4B shows a state where clearances between the inner clutch plates 231 and the outer clutch plates 232 are eliminated. FIG. 4C shows a state where the piston 20 is further moved from the state shown in FIG. 4B and presses the inner clutch plates 231 and the outer clutch plates 232 against each other.

Each of the inner clutch plates 231 includes an annular base 230 formed from a metal plate, and a friction member 233 bonded on each side of the base 230. The friction member 233 may be, for example, formed from paper friction material or non-woven fabric material, and is bonded on the base 230 such that the friction member 233 faces an adjacent one of the outer clutch plates 232. The base 230 may be, for example, made of iron-based metal and has a flow hole 231b (refer to FIG. 3) that the lubricating oil flows through and that is located radially inside the friction member 233. Each of the outer clutch plates 232 may be, for example, an annular plate made of iron-based metal and has an oil groove (not illustrated) on its surface.

As illustrated in FIG. 4A, in an initial state where the piston 20 is in the initial position, there are clearances between the inner clutch plates 231 and the outer clutch plates 232, specifically, between the friction members 233 of the inner clutch plates 231, and the outer clutch plates 232. The lubricating oil fills the clearances, thus allowing relative rotation between the clutch hub 21 and the clutch drum 22.

As illustrated in FIG. 4B, when the piston 20 is moved from the initial position, and all the clearances between the inner clutch plates 231 and the outer clutch plates 232 are eliminated, almost all the lubricating oil is pushed out from between the inner clutch plates 231 and the outer clutch plates 232. In this state, although the inner clutch plates 231 (the friction members 233) and the outer clutch plates 232 may be in contact with each other such that drag torque due to the viscosity of the lubricating oil is transmittable between the clutch hub 21 and the clutch drum 22, there is no transmission of rotational force that is caused by frictional contact between the inner clutch plates 231 and the outer clutch plates 232.

When the piston 20 is further moved after the clearances in the multi-plate clutch 23 are eliminated as described above, the friction members 233 of the inner clutch plates 231 are compressed between the wall portion 223 of the clutch drum 22 and the piston 20, as illustrated in FIG. 4C. This brings the inner clutch plates 231 and the outer clutch plates 232 into frictional contact with each other, thereby transmitting a rotational force between the clutch hub 21 and the clutch drum 22. Thus, the four-wheel drive vehicle 100 switches to the four-wheel drive mode.

Figure 5:
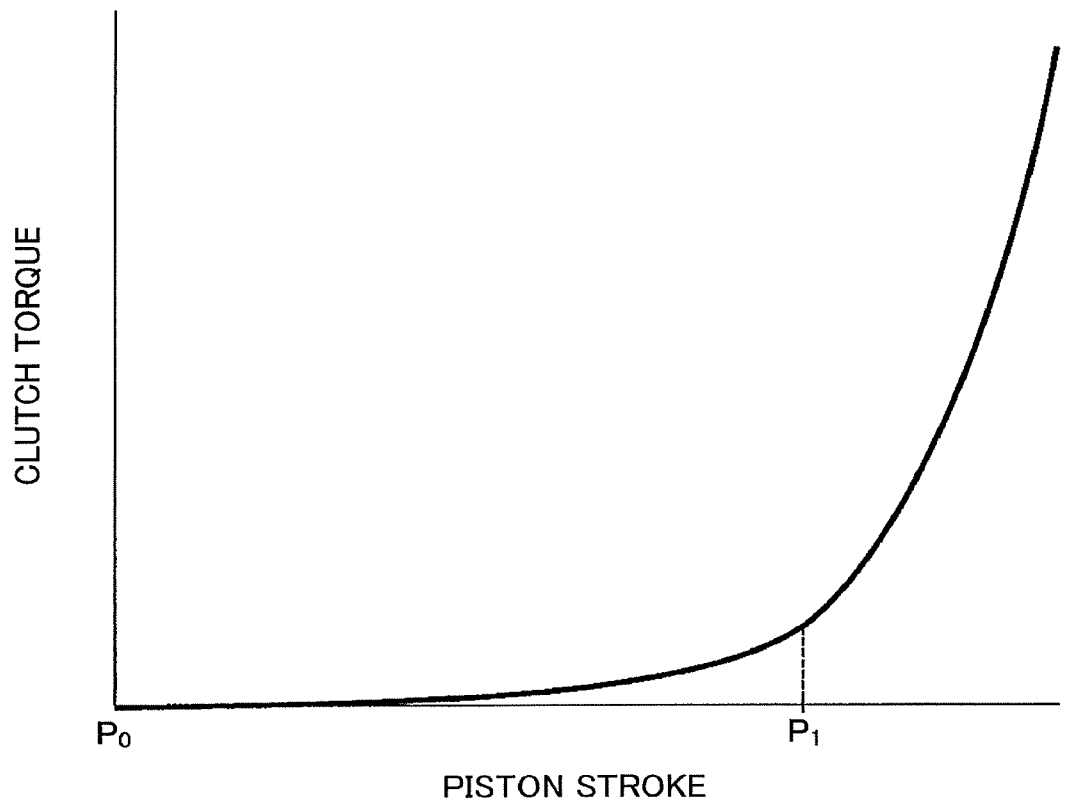
FIG. 5 is a graph illustrating an example of the relationship between the amount of movement of a piston from its initial position and a rotational force transmitted through the multi-plate clutch.

FIG. 5 is a graph illustrating an example of the relationship between the amount of movement (a piston stroke) of the piston 20 from the initial position and the rotational force (clutch torque) that is transmitted between the clutch hub 21 and the clutch drum 22 through the multi-plate clutch 23. In this graph, a value $P_0$ on the horizontal axis that represents the piston stroke corresponds to the initial position of the piston 20, and a value $P_1$ corresponds to a position of the piston 20 when the clearances in the multi-plate clutch 23 are eliminated as illustrated in FIG. 4B. The clutch torque gradually changes when the piston stroke is less than or equal to the value $P_1$ and sharply increases when the piston stroke exceeds the value $P_1$.

Figure 6:
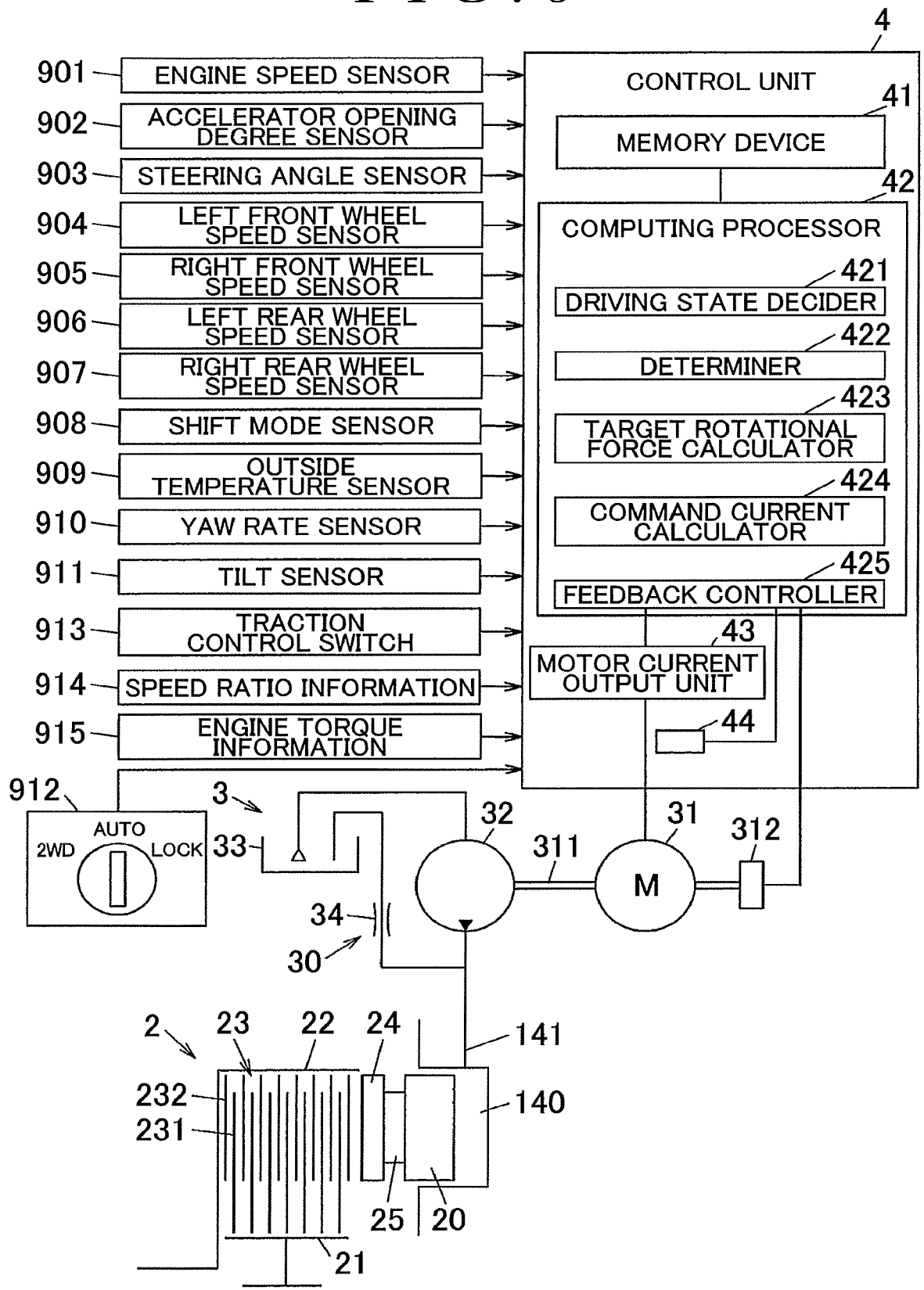
FIG. 6 is a schematic diagram illustrating the structure of a clutch unit, a hydraulic unit, and a control unit of the drive force transmission apparatus.

FIG. 6 is a schematic diagram illustrating the structure of the clutch unit 2, the hydraulic unit 3, and the control unit 4 of the drive force transmission apparatus 1. The hydraulic unit 3 includes the following: an electric motor 31 that is supplied with electric current and generates torque in accordance with the supplied current; a hydraulic pump 32 that is driven by the electric motor 31; and a fixed throttle valve 34 that returns, to a reservoir 33, part of hydraulic oil discharged from the hydraulic pump 32. The electric motor 31 and the hydraulic pump 32 are coupled together by a coupling shaft 311. The electric motor 31 may be, for example, a three-phase brushless direct current (DC) motor. Alternatively, the electric motor 31 may be a brush DC motor. The structure for adjusting hydraulic pressure that is supplied to the cylinder chamber 140 may be modified such that the hydraulic pump 32 discharges a constant amount of hydraulic oil and such that an electromagnetic variable throttle valve instead of the fixed throttle valve 34 is placed between the hydraulic pump 32 and the hydraulic oil supply hole 141 to adjust the hydraulic pressure supplied to the cylinder chamber 140. In this modification, the electromagnetic variable throttle valve may be replaced with an electromagnetic relief valve.

The control unit 4 supplies motor current to the electric motor 31. By adjusting torque generated by the electric motor 31, the drive force transmission apparatus 1 adjusts a rotational force (a drive force) that is transmitted between the clutch hub 21 and the clutch drum 22 through the multi-plate clutch 23.

The hydraulic pump 32 has a common structure. The hydraulic pump 32 draws, from the reservoir 33, an amount of hydraulic oil corresponding to the amount of rotation of the electric motor 31 and discharges the hydraulic oil. The fixed throttle valve 34 returns, to the reservoir 33, an amount of hydraulic oil corresponding to a discharge pressure of the hydraulic pump 32. The hydraulic pump 32 may be, for example, an external gear pump, an internal gear pump, or a vane pump. According to the first embodiment, the electric motor 31, the hydraulic pump 32, and the fixed throttle valve 34 form an actuator 30 that moves the piston 20 in the axial direction. The actuator 30 is controlled by the control unit 4 and moves the piston 20 toward the multi-plate clutch 23 by the pressure in the cylinder chamber 140 that is supplied with the hydraulic oil discharged from the hydraulic pump 32.

The electric motor 31 is provided with a rotation amount sensor 312 for detecting the amount of rotation of the coupling shaft 311. The rotation amount sensor 312 outputs, to the control unit 4, a pulse signal having a pulse width corresponding to the rotational speed of the coupling shaft 311.

The control unit 4 includes the following: a semiconductor memory device 41; a computing processor 42, such as a central processing unit (CPU), that executes a program stored in the memory device 41; a motor current output unit 43 that has switching elements, such as power transistors; and a current sensor 44 for detecting the motor current that is supplied from the motor current output unit 43 to the electric motor 31. The switching elements of the motor current output unit 43 are switched ON and OFF in response to a pulse width modulation (PWM) signal output from the computing processor 42. The computing processor 42 changes the duty ratio of the PWM signal in accordance with how much motor current should be supplied to the electric motor 31.

By executing the program stored in the memory device 41, the computing processor 42 functions as a driving state decider 421, a determiner 422, a target rotational force calculator 423, a command current calculator 424, and a feedback controller 425. The driving state decider 421 decides whether the four-wheel drive vehicle 100 should travel in the four-wheel drive mode or in the two-wheel drive mode. The determiner 422 determines whether the piston 20 needs to be displaced with respect to the initial position toward the multi-plate clutch 23 in the two-wheel drive mode of the four-wheel drive vehicle 100. The target rotational force calculator 423 calculates a target rotational force that should be transmitted between the clutch hub 21 and the clutch drum 22 in the four-wheel drive mode of the four-wheel drive vehicle 100. The command current calculator 424 calculates a command current value indicating the value of electric current that should be supplied to the electric motor 31. The feedback controller 425 calculates a duty ratio that allows electric current having the command current value to be supplied to the electric motor 31 and outputs a PWM signal with the duty ratio to the motor current output unit 43.

The control unit 4 is allowed to acquire, for example, via an in-vehicle network such as a Controller Area Network (CAN), information about values detected by various sensors including an engine speed sensor 901, an accelerator opening degree sensor 902, a steering angle sensor 903, a left front wheel speed sensor 904, a right front wheel speed sensor 905, a left rear wheel speed sensor 906, a right rear wheel speed sensor 907, a shift mode sensor 908, an outside temperature sensor 909, a yaw rate sensor 910, and a tilt sensor 911. Further, the control unit 4 is allowed to acquire, for example, via such an in-vehicle network, the operational state of a driving mode selection switch 912, the operational state of a traction control switch 913, speed ratio information 914 indicating the speed ratio of the transmission 103, and engine torque information 915 indicating the magnitude of torque output from the engine 102.

The engine speed sensor 901 detects an engine speed, i.e., the number of revolutions of a crankshaft that is an output shaft of the engine 102 per unit time. The accelerator opening degree sensor 902 detects an accelerator pedal depression amount that is the amount by which a driver depresses an accelerator pedal. The steering angle sensor 903 detects a steering angle of a steering wheel operated by a driver. The left front wheel speed sensor 904, the right front wheel speed sensor 905, the left rear wheel speed sensor 906, and the right rear wheel speed sensor 907 respectively detect the rotational speeds of the left front wheel 104L, the right front wheel 104R, the left rear wheel 105L, and the right rear wheel 105R. The shift mode sensor 908 detects a position of a shift lever operated by a driver. An outside temperature sensor 909 detects an ambient temperature outside the four-wheel drive vehicle 100. The yaw rate sensor 910 detects a yaw rate acting on the four-wheel drive vehicle 100 (i.e., an angular velocity around the vertical axis of the four-wheel drive vehicle 100). The tilt sensor 911 detects a longitudinal inclination of the four-wheel drive vehicle 100.

The driving mode selection switch 912 allows a driver to select a driving mode of the four-wheel drive vehicle 100 from among a 2WD mode, an AUTO mode, and a LOCK mode. The 2WD mode fixes the driving state of the four-wheel drive vehicle 100 to the two-wheel drive mode. The LOCK mode fixes the driving state of the four-wheel drive vehicle 100 to the four-wheel drive mode by supplying the electric motor 31 with electric current having a value that does not allow relative rotation between the clutch hub 21 and the clutch drum 22. The AUTO mode switches the driving state of the four-wheel drive vehicle 100 between the two-wheel drive mode and the four-wheel drive mode automatically in accordance with the traveling state of the four-wheel drive vehicle 100.

The traction control switch 913 is used to enable or disable a traction control system of the four-wheel drive vehicle 100. The traction control system limits a drive force or braking force transmitted to the front wheels 104R and 104L and the rear wheels 105R and 105L, thereby ensuring stability during travel of the four-wheel drive vehicle 100. Enabling the traction control system improves the stability during travel of the four-wheel drive vehicle 100. On the other hand, disabling the traction control system makes it possible, for example, that a driver with great driving skills drives the four-wheel drive vehicle 100 on a curve at high speeds with the front wheels 104R and 104L or the rear wheels 105R and 105L slipping.

The determiner 422 determines that the piston 20 needs to be displaced with respect to the initial position toward the multi-plate clutch 23, when there is a high possibility that the four-wheel drive vehicle 100 traveling in the two-wheel drive mode will need to be switched to the four-wheel drive mode. The values detected by the sensors 901 to 911, the operational states of the switches 912 and 913, the speed ratio information 914, and the engine torque information 915 are examples of vehicle information indicating the state of the four-wheel drive vehicle 100. The determiner 422 determines, on the basis of the vehicle information, whether the piston 20 needs to be displaced with respect to the initial position toward the multi-plate clutch 23.

According to the first embodiment, the control unit 4 causes the actuator 30 to displace the piston 20 by a predetermined amount with respect to the initial position toward the multi-plate clutch 23, when at least one of first to ninth conditions described later is satisfied with the AUTO mode selected by the driving mode selection switch 912. The predetermined amount displaces the piston 20 to such an extent that transmission of rotational force between the clutch hub 21 and the clutch drum 22 is not caused by friction between the inner clutch plates 231 and the outer clutch plates 232, or that even when a frictional force is generated between the inner clutch plates 231 and the outer clutch plates 232, a rotational force transmitted by the frictional force is too small to substantially switch the four-wheel drive vehicle 100 to the four-wheel drive mode.

The first condition is that an estimated value of a road surface friction coefficient is less than a predetermined coefficient value. The road surface friction coefficient is the coefficient of friction of a road surface on which the four-wheel drive vehicle 100 travels. The road surface friction coefficient may be estimated, for example, on the basis of a slip amount of the front wheels 104R and 104L. Specifically, the road surface friction coefficient may be estimated and calculated on the basis of the difference between theoretical and actual rotational speeds of the front wheels 104R and 104L. The theoretical rotational speed is calculated on the basis of the value detected by the engine speed sensor 901 and the speed ratio information 914. The actual rotational speed is calculated on the basis of the values detected by the left front wheel speed sensor 904 and the right front wheel speed sensor 905. Alternatively, the road surface friction coefficient may be estimated, for example, on the basis of a road surface condition captured by a camera mounted on the four-wheel drive vehicle 100.

If the estimated value of the road surface friction coefficient is less than the predetermined coefficient value, there is a high probability that the front wheels 104R and 104L will slip. If the front wheels 104R and 104L slip, it is necessary, in order to stop the slipping of the front wheels 104R and 104L, to quickly switch the driving state of the four-wheel drive vehicle 100 to the four-wheel drive mode so that the drive force of the engine 102 is distributed to the rear wheels 105R and 105L.

The second condition is that a road surface gradient detected by the tilt sensor 911 is greater than a predetermined gradient value. The road surface gradient is the inclination of a road surface on which the four-wheel drive vehicle 100 travels, in particular, the slope of an uphill road, relative to the horizontal direction. On uphill roads, vertical loads on the front wheels 104R and 104L decrease, thus increasing the likelihood of the front wheels 104R and 104L slipping.

The third condition is that the outside ambient temperature detected by the outside temperature sensor 909 is less than a predetermined temperature value. The predetermined temperature value may be set to, for example, zero degrees Celsius (° C.). Low outside ambient temperatures increase the likelihood of the front wheels 104R and 104L slipping, for example, because the road surface becomes icy.

The fourth condition is that the operated position of the shift lever detected by the shift mode sensor 908 is where the speed ratio (the reduction ratio) of the transmission 103 is kept higher than normal, e.g., where a sport mode is selected in an automatic transmission. Selecting such a mode increases the likelihood of a drive force that is large relative to the traveling speed of the four-wheel drive vehicle 100 being transmitted to the front wheels 104R and 104L, thus increasing the likelihood of the front wheels 104R and 104L slipping.

The fifth condition is that the traction control switch 913 is in OFF state (i.e., the traction control system is disabled). Disabling the traction control system increases the likelihood that a drive force that is large enough to cause slipping is transmitted to the front wheels 104R and 104L.

The sixth condition is that the four-wheel drive vehicle 100 is in a sport travel state. The sport travel state refers to, for example, a state where sudden acceleration occurs frequently. Determining whether or not the four-wheel drive vehicle 100 is in the sport travel state may be performed, for example, on the basis of at least one of the engine speed detected by the engine speed sensor 901 and the accelerator pedal depression amount detected by the accelerator opening degree sensor 902.

The seventh condition is that the slip amount of the front wheels 104R and 104L is greater than a predetermined amount. In cases where the road surface friction coefficient is estimated on the basis of the slip amount of the front wheels 104R and 104L in determining whether the first condition is satisfied, the seventh condition may be also satisfied when the first condition is satisfied.

The eighth condition is that a grip margin of the front wheels 104R and 104L is less than a predetermined margin. The grip margin refers to a margin of tire grip of the front wheels 104R and 104L and is calculated on the basis of the relationship between the radius of a friction circle, and tire lateral force and drive force exerted on the front wheels 104R and 104L. The radius of the friction circle is determined by loads and the coefficient of friction between the road surface and tires. For example, when the four-wheel drive vehicle 100 accelerates while making a turn, the grip margin decreases, thus increasing the likelihood of the front wheels 104R and 104L slipping.

The ninth condition is that a yaw rate difference is greater than a predetermined difference value. The yaw rate difference is the difference between theoretical and actual yaw rates. The theoretical yaw rate is calculated on the basis of the traveling speed and the steering angle detected by the steering angle sensor 903. The actual yaw rate is detected by the yaw rate sensor 910. A great yaw rate difference indicates that the behavior of the four-wheel drive vehicle 100 is unstable due to understeer or oversteer, i.e., indicates a high possibility that the four-wheel drive vehicle 100 will need to be switched to the four-wheel drive mode.

When at least one of the first to ninth conditions is satisfied, the control unit 4 causes the actuator 30 to displace the piston 20 with respect to the initial position toward the multi-plate clutch 23. The piston 20 is displaced, for example, to a clearance elimination position (a position corresponding to the value $P_1$ of the piston stroke on the graph in FIG. 5) where elimination of the clearances in the multi-plate clutch 23 is completed as illustrated in FIG. 4B. Alternatively, the piston 20 may be displaced to a position that is closer to the initial position than the clearance elimination position or may be displaced to a position that is farther from the initial position (i.e., closer to the wall portion 223 of the clutch drum 22) than the clearance elimination position.

The control unit 4 may cause the actuator 30 to displace the piston 20 with respect to the initial position toward the multi-plate clutch 23, when at least one of selected ones of the first to ninth conditions is satisfied. Additional conditions for displacing the piston 20 with respect to the initial position toward the multi-plate clutch 23 may be imposed in addition to the first to ninth conditions. When the AUTO mode is selected by the driving mode selection switch 912, the piston 20 may be unconditionally displaced with respect to the initial position toward the multi-plate clutch 23.

Figure 7:
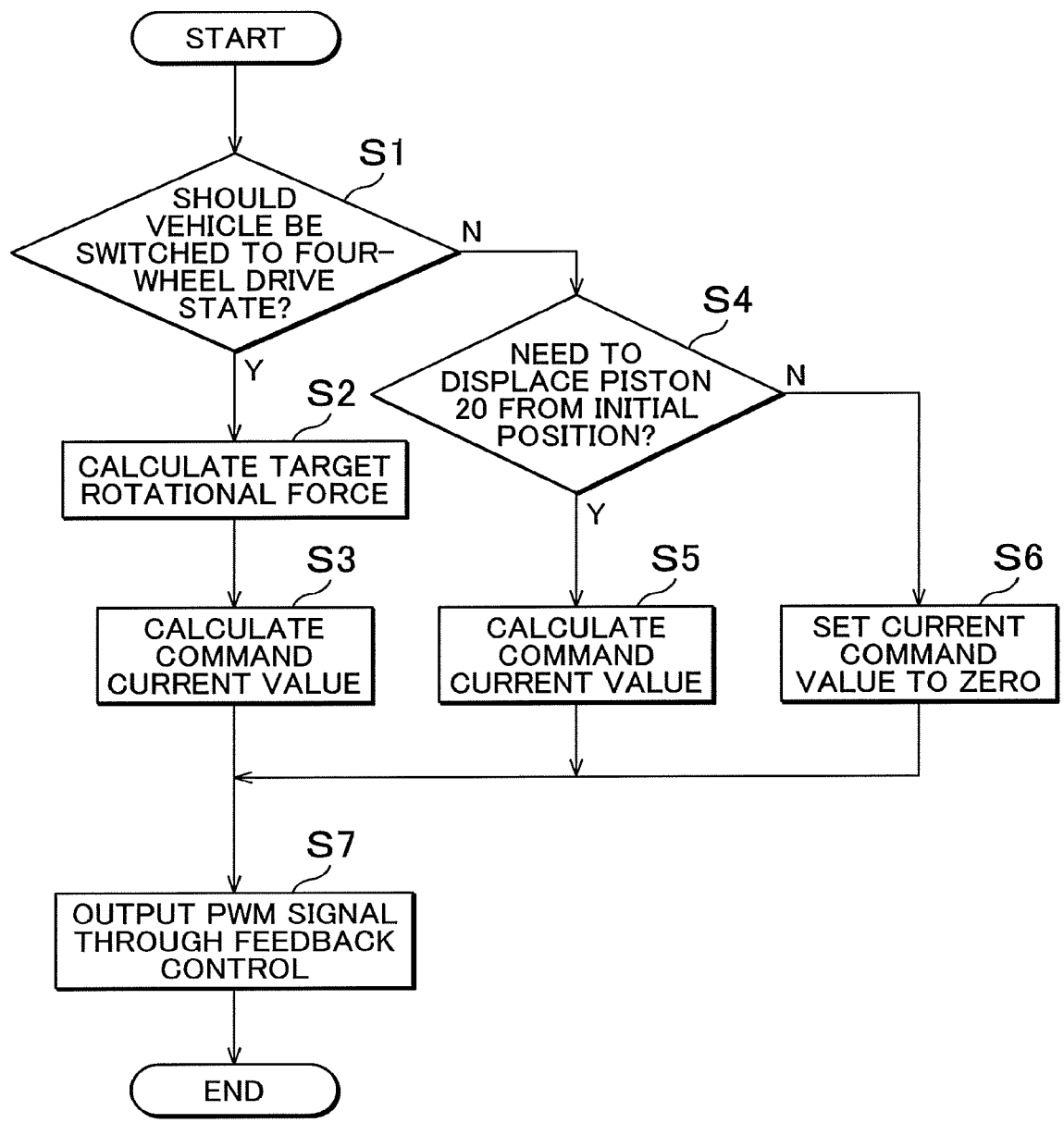
FIG. 7 is a flowchart illustrating a specific example of a process that is performed by a computing processor.

FIG. 7 is a flowchart illustrating a specific example of a process that is performed by the computing processor 42. The computing processor 42 performs this process at predetermined control intervals.

The computing processor 42 decides, on the basis of the vehicle information, whether the four-wheel drive vehicle 100 should be switched to the four-wheel drive mode (step S1). For example, when the accelerator pedal depression amount or a differential rotational speed exceeds their respective thresholds, the computing processor 42 decides that the driving state should be switched to the four-wheel drive mode. The differential rotational speed is the difference between the average rotational speed of the front wheels 104R and 104L and the average rotational speed of the rear wheels 105R and 105L.

If it is decided that the driving state should be switched to the four-wheel drive mode (S1: Yes), the computing processor 42 calculates, on the basis of the vehicle information, a target rotational force that should be transmitted between the clutch hub 21 and the clutch drum 22, i.e., a drive force that should be transmitted to the rear wheels 105R and 105L (step S2). Then, the computing processor 42 calculates a command current value indicating the value of electric current that should be supplied to the electric motor 31, in accordance with the target rotational force calculated in step S2 (step S3). In the calculation procedure of step S2, the target rotational force is set to a larger value, for example, as the accelerator pedal depression amount increases or as the differential rotational speed increases. As already described, the differential rotational speed is the difference between the average rotational speed of the front wheels 104R and 104L and the average rotational speed of the rear wheels 105R and 105L.

In contrast, if it is not decided that the driving state should be switched to the four-wheel drive mode (S1: No), the computing processor 42 determines whether the piston 20 needs to be displaced with respect to the initial position toward the multi-plate clutch 23 (step S4). If it is determined, upon satisfaction of at least one of the first to ninth conditions described above, that the piston 20 needs to be displaced (S4: Yes), the computing processor 42 calculates a command current value indicating the value of electric current that should be supplied to the electric motor 31 (step S5). The command current value calculated in step S5 is less than the command current value calculated in step S3. The command current value calculated in step S5 displaces the piston 20 with respect to the initial position toward the multi-plate clutch 23 to an extent that does not substantially switch the driving state of the four-wheel drive vehicle 100 to the four-wheel drive mode.

In the procedure of step S5, the command current value may be changed in accordance with which of the first to ninth conditions is satisfied or may be unchanged regardless of which of the first to ninth conditions is satisfied. Further, in the procedure of step S5, the command current value may be changed in accordance with how many conditions are satisfied. In this case, the command current value may be increased as the number of satisfied conditions increases.

In contrast, if it is not determined that the piston 20 needs to be displaced (S4: No), the computing processor 42 sets the command current value to zero (step S6).

Then, the computing processor 42 performs feedback control to calculate a duty ratio that allows the electric current supplied to the electric motor 31 to have the command current value calculated through steps S1 to S6, and outputs a PWM signal with the duty ratio to the motor current output unit 43 (step S7). In this procedure, when an actual current value detected by the current sensor 44 is less than the command current value, the duty ratio is increased, and when the actual current value is greater than the command current value, the duty ratio is decreased.

In the process illustrated by the flowchart of FIG. 7, the procedure of step S1 is performed by the computing processor 42 functioning as the driving state decider 421. The procedure of step S2 is performed by the computing processor 42 functioning as the target rotational force calculator 423. The procedures of steps S3, S5, and S6 are performed by the computing processor 42 functioning as the command current calculator 424. The procedure of step S4 is performed by the computing processor 42 functioning as the determiner 422. The procedure of step S7 is performed by the computing processor 42 functioning as the feedback controller 425.

As long as at least one of the first to ninth conditions remains satisfied, the control unit 4 continues to supply the electric motor 31 with electric current necessary to keep the piston 20 in a position that is away from the initial position by the predetermined amount toward the multi-plate clutch 23. At this time, as much hydraulic oil as the hydraulic pump 32 discharges returns from the fixed throttle valve 34 to the reservoir 33.

As described above, according to the first embodiment of the invention, upon satisfaction of a predetermined condition that indicates a high probability of the four-wheel drive vehicle 100 needing to be switched from the two-wheel drive mode to the four-wheel drive mode, the control unit 4 causes the actuator 30 to preliminarily displace the piston 20 by the predetermined amount with respect to the initial position toward the multi-plate clutch 23. This feature makes it possible to switch the driving state quickly, as compared to moving the piston 20 from the initial position when it becomes necessary to switch the driving state from the two-wheel drive mode to the four-wheel drive mode.

Further, this feature ensures responsiveness while allowing for large clearances between the inner clutch plates 231 and the outer clutch plates 232 in a non-operating state, thus making it possible to reduce drag torque and to reduce the likelihood of the multi-plate clutch 23 being damaged by, for example, excessive heat that is generated when the four-wheel drive vehicle 100 is towed with the rear wheels 105R and 105L on the ground and with the front wheels 104R and 104L lifted from the ground.

Moreover, unlike the related-art drive force transmission apparatus, the drive force transmission apparatus 1 according to the first embodiment does not require additional members for improving the responsiveness. This suppresses an increase in the apparatus size and cost.

Next, a second embodiment of the invention is described with reference to FIGS. 8 to 11. The second embodiment differs from the first embodiment in the structure of a drive force transmission system 101 of a four-wheel drive vehicle 100 and in the structure of a drive force transmission apparatus 1A.

Figure 8:
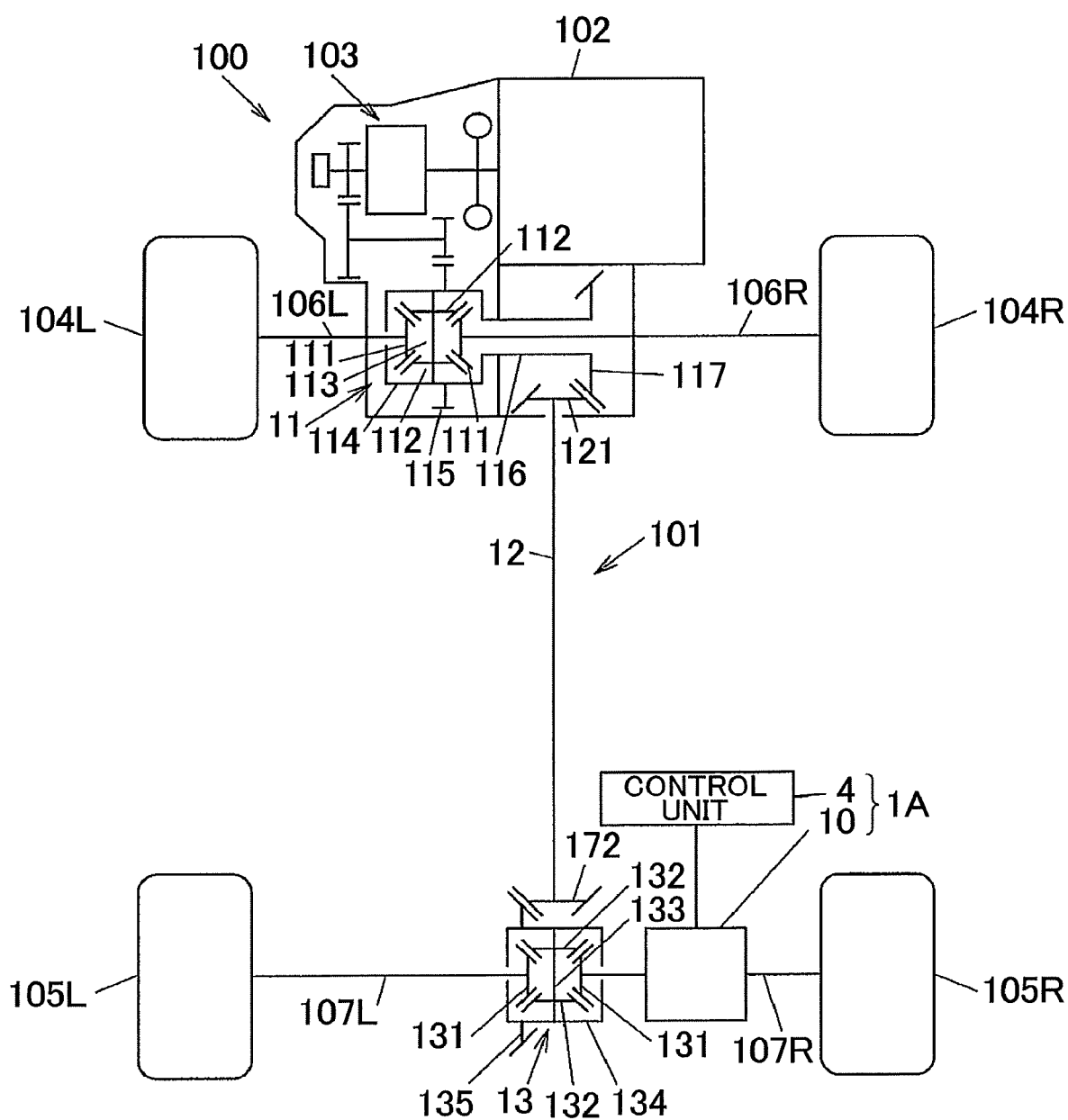
FIG. 8 is a schematic diagram illustrating the structure of a four-wheel drive vehicle according to a second embodiment.

FIG. 8 is a schematic diagram illustrating the structure of the four-wheel drive vehicle 100 according to the second embodiment. In FIG. 8, the structures common to the first and second embodiments are denoted by the same reference symbols as those used in the first embodiment, and the already described features of the common structures are not described in the second embodiment.

According to the first embodiment, the clutch unit 2 is located between the drive shaft 107L and the left one of the pair of side gears 131 of the rear differential 13. In contrast, according to the second embodiment, a drive force transmission mechanism 10 is located between the drive shaft 107R and the right one of the pair of side gears 131. According to the second embodiment, the drive force transmission mechanism 10 and a control unit 4 form the drive force transmission apparatus 1A.

Figure 9:
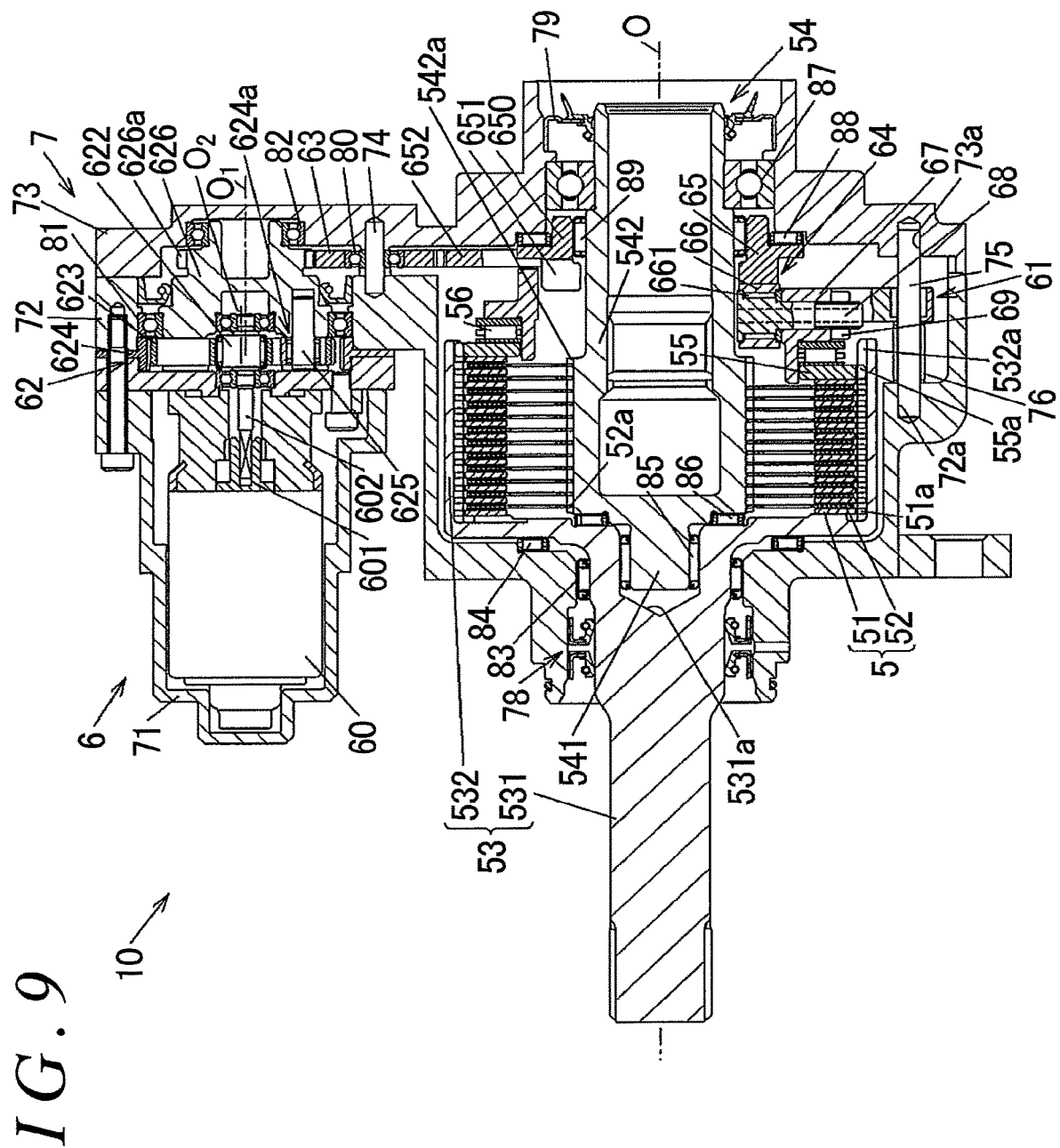
FIG. 9 is a cross-sectional view illustrating the structure of a drive force transmission apparatus.

FIG. 9 is a cross-sectional view illustrating the structure of the drive force transmission mechanism 10. In FIG. 9, an upper area above the rotation axis O illustrates a state where the drive force transmission mechanism 10 is in a non-operating state, and a lower area below the rotation axis O illustrates a state where the drive force transmission mechanism 10 is in an operating state.

The drive force transmission mechanism 10 includes the following: a multi-plate clutch 5 having multiple outer clutch plates 51 and inner clutch plates 52 that are aligned in the axial direction; a clutch drum 53 and a clutch hub 54 that are rotatable relative to each other on the same axis of rotation; a pressing member 55 that presses the multi-plate clutch 5; an electric motor 60 that generates torque in accordance with electric current supplied from the control unit 4; a moving mechanism 61 that moves the pressing member 55 in the axial direction in accordance with the amount of rotation of the electric motor 60; a housing 7 that houses the multi-plate clutch 5, the electric motor 60, and the moving mechanism 61; sealing members 78 and 79 that seal the housing 7 to retain lubricating oil (not illustrated) in the housing 7; and bearings 80 to 89 that allow smooth rotation of each member. The electric motor 60 and the moving mechanism 61 are controlled by the control unit 4 and form an actuator 6 that moves the pressing member 55 in the axial direction.

The moving mechanism 61 includes the following: a drive shaft 602 coupled to a rotor 601 of the electric motor 60 such that the drive shaft 602 is not rotatable relative to the rotor 601; a speed reducer 62 that reduces the speed of a rotational output of the drive shaft 602; a counter gear 63 that transmits an output of the speed reducer 62; and a cam mechanism 64 that receives the rotational force of the electric motor 60 through the speed reducer 62 and the counter gear 63, thereby generating a pressing force that presses the multi-plate clutch 5.

The housing 7 includes first, second, and third housing members 71, 72, and 73. The first housing member 71 houses the electric motor 60. The second and third housing members 72 and 73 house the multi-plate clutch 5 and the moving mechanism 61. The counter gear 63 is supported by the bearing 80 on a supporting shaft 74 that is supported between the second and third housing members 72 and 73. The lubricating oil (not illustrated) is enclosed in the housing 7.

According to the second embodiment, the speed reducer 62 is an involute speed reducer and includes the following: an eccentric member 622 having a central axis $O_2$ that is eccentric by a predetermined amount relative to an axis $O_1$ of the drive shaft 602; an input member 623 formed as an external gear and having a central hole that holds the eccentric member 622; a rotational force applying member 624 formed as an internal gear and having a central axis that coincides with the axis $O_1$; multiple shaft members 625 held by bearings in a holding hole 624a formed in the rotational force applying member 624; and an output member 626 that rotates by receiving, through the shaft members 625, a rotational force applied by the rotational force applying member 624 to the input member 623. The output member 626 is rotatably supported by the bearings 81 and 82 and has a gear portion 626a that meshes with the counter gear 63.

The clutch drum 53 integrally includes a shaft portion 531 and a bottomed cylindrical portion 532. The shaft portion 531 of the clutch drum 53 is splined to the right side gear 131 of the rear differential 13 and thus is not rotatable relative to the right side gear 131. The bearings 83 and 84 and the sealing member 78 are located between the clutch drum 53 and the first housing member 71.

The clutch hub 54 integrally includes a shaft-shaped boss portion 541 and a bottomed cylindrical portion 542. The axis of the boss portion 541 coincides with the rotation axis O. The boss portion 541 is held by the bearing 85 in a recess 531a that is formed in the shaft portion 531 of the clutch drum 53. A part of the cylindrical portion 542 that is located closer to the boss portion 541 is housed in the cylindrical portion 532 of the clutch drum 53. The bearing 86 is located between the clutch drum 53 and an axial end surface of the cylindrical portion 542 that is located closer to the boss portion 541. The bearing 87 and the sealing member 79 are located between the third housing member 73 and an end of the cylindrical portion 542 that is located farther from the boss portion 541.

The multi-plate clutch 5 is located between the cylindrical portion 532 of the clutch drum 53 and the cylindrical portion 542 of the clutch hub 54. The cylindrical portion 532 of the clutch drum 53 has an inner circumferential surface provided with straight spline fit portions 532a that are engaged with multiple projections 51a of the outer clutch plates 51. The cylindrical portion 542 of the clutch hub 54 has an outer circumferential surface provided with straight spline fit portions 542a that are engaged with multiple projections 52a of the inner clutch plates 52. The outer clutch plates 51 are movable in the axial direction relative to the clutch drum 53 and are not rotatable relative to the clutch drum 53. The inner clutch plates 52 are movable in the axial direction relative to the clutch hub 54 and are not rotatable relative to the clutch hub 54.

The pressing member 55 has an annular shape and presses the multi-plate clutch 5 in the axial direction, thereby bringing the outer clutch plates 51 and the inner clutch plates 52 into frictional contact with each other. As in the inner clutch plates 231 according to the first embodiment, each of the inner clutch plates 52 includes an annular base formed from a metal plate, and a friction member bonded on each side of the base. As in the outer clutch plates 232 according to the first embodiment, each of the outer clutch plates 51 is an annular metal plate. The pressing member 55 has an outer circumferential surface provided with multiple spline projections 551 that are engaged with the straight spline fit portions 532a of the clutch drum 53. Thus, the pressing member 55 is movable in the axial direction relative to the clutch drum 53 and is not rotatable relative to the clutch drum 53.

Multiple (three in this example) guide members 75 that are used to operate the cam mechanism 64 are located radially outside the clutch drum 53 and are located between the second housing member 72 and the third housing member 73. The guide members 75 are arranged parallel to the rotation axis O. One of the guide members 75 is illustrated in FIG. 9. Each of the guide members 75 is shaped like a solid cylinder, has a first axial end that is fitted and fixed in a holding hole 72a formed in the second housing member 72, and a second axial end that is fitted and fixed in a holding hole 73a formed in the third housing member 73. A return spring 76 fits over each of the guide members 75. The return spring 76 serves as a biasing member and biases a second cam member 67 of the cam mechanism 64 in the axial direction, as described later. The return spring 76 is a coil spring and is located between the second housing member 72 and the second cam member 67 while being compressed in the axial direction. Thus, the return spring 76 exerts a restoring force that elastically presses the second cam member 67 toward the third housing member 73.

Figure 10:
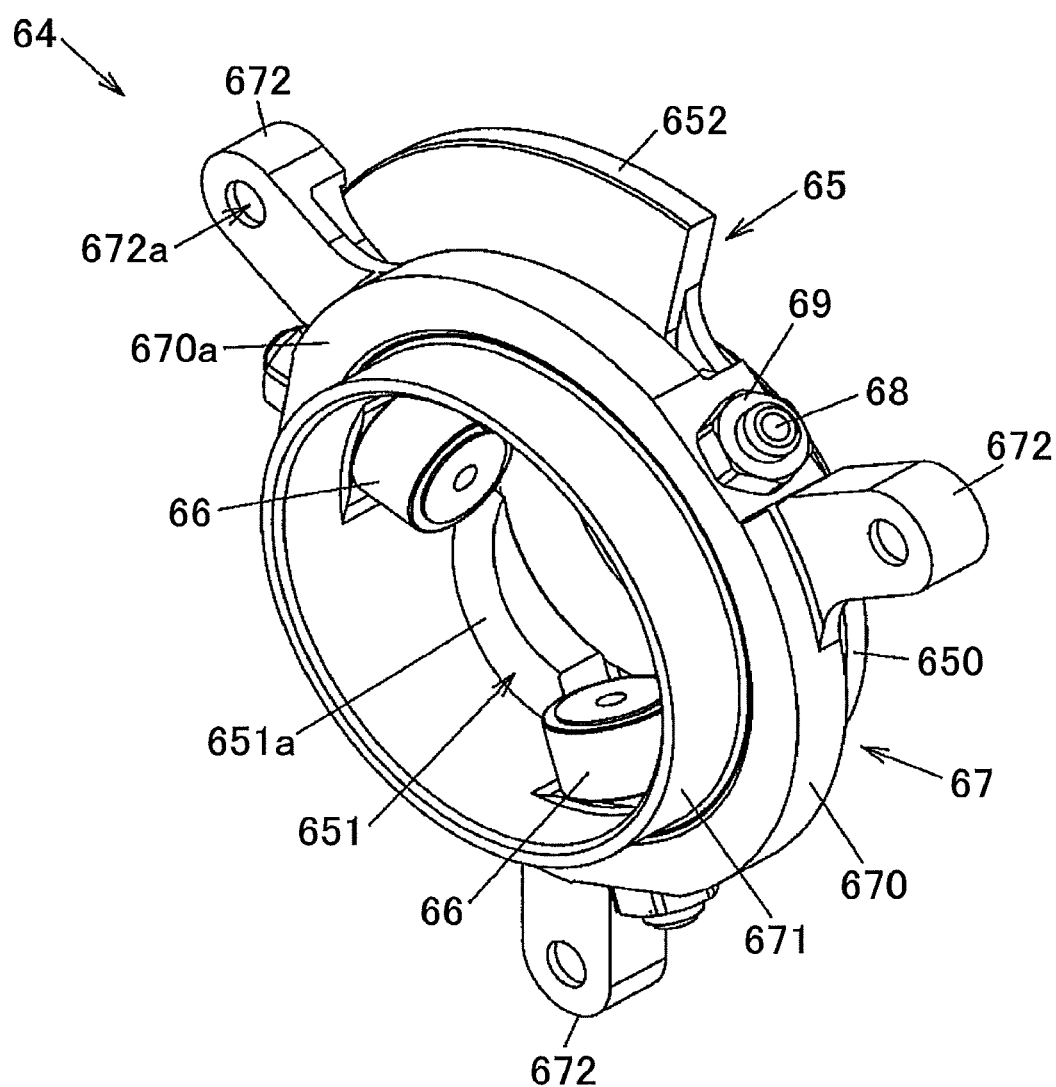
FIG. 10 is a perspective view illustrating a cam mechanism of the drive force transmission apparatus.

FIG. 10 is a perspective view illustrating an example of the structure of the cam mechanism 64. The cam mechanism 64 includes the following: a first cam member 65 having a cam surface 651a that is inclined relative to the rotation axis O; multiple (three in this example) rolling members 66 that roll on the cam surface 651a; the second cam member 67 that has an annular shape and that outputs, to the multi-plate clutch 5, a thrust force generated by the rolling of the rolling members 66; and supporting pins 68 that support the rolling members 66 such that the rolling members 66 are rollable. The second cam member 67 is located closer to the multi-plate clutch 5 than the first cam member 65. The rolling members 66 are located within the second cam member 67.

The first cam member 65 has an annular shape so that the clutch hub 54 is inserted through the first cam member 65. The first cam member 65 integrally includes the following: a base 650 that has an annular plate shape with a predetermined thickness in the direction of the rotation axis O; multiple (three in this example) arc-shaped protrusions 651 that protrude from a side surface of the base 650 toward the multi-plate clutch 5; and a fan-shaped gear portion 652 that protrudes outward from a part of the outer circumferential surface of the base 650. The bearing 88 (refer to FIG. 9) is located between the base 650 and the third housing member 73. The bearing 89 is located between the base 650 and the clutch hub 54.

An axial end surface of each of the protrusions 651 of the first cam member 65 that faces toward the multi-plate clutch 5 serves as the cam surface 651a. The rolling members 66 roll on the cam surface 651a while moving together with the second cam member 67 along the rotation axis O. The outer circumferential surface of the gear portion 652 has gear teeth that mesh with the counter gear 63. FIG. 10 omits the illustration of the gear teeth.

The second cam member 67 integrally includes the following: a retainer base 670 that has an annular plate shape with a predetermined thickness in the direction of the rotation axis O; a cylindrical tube portion 671 that extends from an end surface of the retainer base 670 that faces toward the multi-plate clutch 5; and multiple (three in this example) protruding pieces 672 that protrude outward from different parts of the outer circumferential surface of the retainer base 670.

The retainer base 670 has multiple (three in this example) pin insertion holes that are arranged in a radial manner. The supporting pins 68 are inserted through the pin insertion holes. Each of the supporting pins 68 has an external thread portion that protrudes radially outward from the retainer base 670 and that is threadedly engaged with a nut 69. As such, the supporting pins 68 are fixed to the second cam member 67. Each of the rolling members 66 is supported by a needle roller bearing 661 (refer to FIG. 9) to an end of a corresponding one of the supporting pins 68.

Each of the protruding pieces 672 of the second cam member 67 has a guide insertion hole 672a through which a corresponding one of the guide members 75 is inserted. The insertion of the guide members 75 through the guide insertion holes 672a does not allow relative rotation between the second cam member 67 and the housing 7 and allows relative movement between the second cam member 67 and the housing 7 in the axial direction. An end surface of the protruding piece 672 around the guide insertion hole 672a serves to receive a pressing force from the return spring 76.

The pressing member 55 and a needle roller bearing 56 (refer to FIG. 9) are located radially outside the tube portion 671 of the second cam member 67. The needle roller bearing 56 is located between the pressing member 55 and an axial end surface 670a of the retainer base 670. The rotation of the electric motor 60 causes relative rotation between the first cam member 65 and the second cam member 67 of the cam mechanism 64, and the relative rotation between the first cam member 65 and the second cam member 67 generates a cam thrust force in the axial direction.

Specifically, when the control unit 4 supplies motor current to the electric motor 60, the drive shaft 602 of the electric motor 60 rotates accordingly. The rotational output of the electric motor 60 is reduced in speed by the speed reducer 62 and then is transmitted through the counter gear 63 to the first cam member 65 of the cam mechanism 64. Then, when the first cam member 65 rotates, the rolling members 66 roll on the cam surface 651a of the protrusions 651, and the second cam member 67 moves in the axial direction along the rotation axis O while being guided by the guide members 75. The cam thrust force of the cam mechanism 64 causes the pressing member 55 to press the multi-plate clutch 5.

Figure 11:
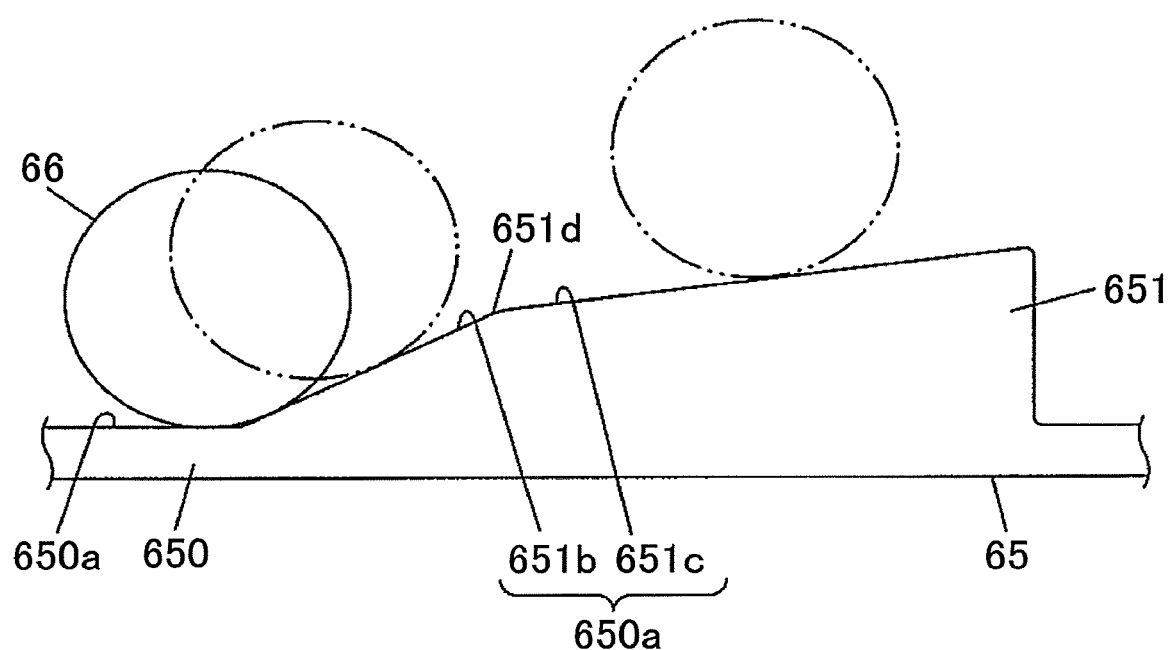
FIG. 11 is a schematic diagram illustrating one of three protrusions of a first cam member and its surrounding area, along with a rolling member, as seen along the circumferential direction of the first cam member.

FIG. 11 is a schematic diagram illustrating one of the three protrusions 651 and its surrounding area, along with the rolling member 66, as seen along the circumferential direction of the first cam member 65. The cam surface 651a of the protrusion 651 includes a first cam surface 651b with a large gradient and a second cam surface 651c with a small gradient. The first cam surface 651b and the second cam surface 651c are smoothly connected together at a boundary 651d. The lateral direction in FIG. 11 corresponds to the circumferential direction of the first cam member 65.

When the drive force transmission mechanism 10 is not operating, the rolling member 66 abuts with an axial end surface 650a of the base 650 of the first cam member 65. The pressing member 55 is closest to the third housing member 73 (i.e., farthest from the multi-plate clutch 5) when the rolling member 66 abuts with the axial end surface 650a of the base 650. The position of the pressing member 55 at this time is hereinafter referred to as an initial position of the pressing member 55. When the pressing member 55 is in the initial position, there are clearances between the outer clutch plates 51 and the inner clutch plates 52 so that the clutch drum 53 and the clutch hub 54 rotate relative to each other.

When the electric motor 60 rotates from the initial state, the first cam member 65 rotates relative to the second cam member 67, and the rolling member 66 rolls on the first cam surface 651b. Accordingly, the pressing member 55 moves toward the multi-plate clutch 5 so that the clearances between the outer clutch plates 51 and the inner clutch plates 52 are reduced. Then, when the rolling member 66 reaches the boundary 651d, all the clearances between the outer clutch plates 51 and the inner clutch plates 52 are eliminated.

When the electric motor 60 further rotates from this state, the rolling member 66 rolls on the second cam surface 651c so that the outer clutch plates 51 and the inner clutch plates 52 are pressed against each other by the pressing member 55. This generates a frictional force between the outer clutch plates 51 and the inner clutch plates 52, and the frictional force transmits a rotational force between the clutch drum 53 and the clutch hub 54. In FIG. 11, the rolling member 66 rolling on the first cam surface 651b and the rolling member 66 rolling on the second cam surface 651c are each represented by a long dashed double-short dashed line.

The rotational force transmitted between the clutch drum 53 and the clutch hub 54 increases with an increase in the displacement of the rolling member 66 from its initial position. By controlling the actuator 6, the control unit 4 adjusts the rotational force that is transmitted between the clutch drum 53 and the clutch hub 54 through the multi-plate clutch 5.

The control unit 4 has the same structure as the control unit 4 that is described in the first embodiment with reference to FIG. 6. In addition, according to the second embodiment, as long as at least one of the first to ninth conditions remains satisfied, the control unit 4 continues to supply the electric motor 60 with electric current necessary to keep the pressing member 55 in a position that is away from the initial position by the predetermined amount toward the multi-plate clutch 5. The axial position of the pressing member 55 is determined by which portion of the cam surface 651a is in contact with the rolling member 66 and is where the cam thrust force that the pressing member 55 receives from the cam mechanism 64 balances with the sum of the biasing force of the return springs 76 and the reaction force from the multi-plate clutch 5 that the pressing member 55 receives.

The second embodiment has the same advantages as the first embodiment. In addition, since the cam surface 651a of the first cam member 65 has the first cam surface 651b with a large gradient and the second cam surface 651c with a small gradient, the pressing member 55 moves toward the multi-plate clutch 5 more quickly when the rolling member 66 rolls on the first cam surface 651b. This feature reduces the time required to complete elimination of the clearances in the multi-plate clutch 5, thus further improving the responsiveness of the drive force transmission apparatus 1A.

The embodiments may be modified in various ways within the scope of the invention. For example, although the embodiments take an internal-combustion engine as an example of the drive source, the drive source may be an electric motor or a combination of an engine and an electric motor.

What is claimed is:

1. A drive force transmission apparatus mountable on a four-wheel drive vehicle that is switchable between a four-wheel drive mode and a two-wheel drive mode, the four-wheel drive mode transmitting a drive force of a drive source to main drive wheels and auxiliary drive wheels, the two-wheel drive mode transmitting the drive force to only the main drive wheels, the drive force transmission apparatus configured to allow adjustment of the drive force that is transmitted to the auxiliary drive wheels, the drive force transmission apparatus comprising:
 a multi-plate clutch having a plurality of clutch plates aligned with each other in an axial direction;
 a pressing member that presses the multi-plate clutch in the axial direction;
 an actuator that moves the pressing member in the axial direction; and
 a control unit configured to
  determine how many of a plurality of predetermined conditions are satisfied with the four-wheel drive vehicle in the two-wheel drive mode, each of the predetermined conditions indicating an increased probability that the four-wheel drive mode is to be engaged, and
  control the actuator to displace the pressing member by a predetermined amount with respect to an initial position of the pressing member toward the multi-plate clutch, the predetermined amount increasing in proportion to a number of predetermined conditions that are satisfied, and the predetermined amount is less than a displacement amount to engage the four-wheel drive mode.

2. The drive force transmission apparatus according to claim 1, wherein
 the predetermined conditions include at least one of a first condition, a second condition, and a third condition,
 the first condition is that an estimated value of a coefficient of friction of a road surface is less than a predetermined coefficient value,
 the second condition is that a gradient of the road surface is greater than a predetermined gradient value, and
 the third condition is that an outside ambient temperature is less than a predetermined temperature value.

3. The drive force transmission apparatus according to claim 1, wherein
 the four-wheel drive vehicle has a first mode, a second mode, and a third mode that are selectable by a driver,
 the first mode fixes a driving state of the four-wheel drive vehicle to the two-wheel drive mode,
 the second mode fixes the driving state to the four-wheel drive mode,
 the third mode switches the driving state between the two-wheel drive mode and the four-wheel drive mode automatically in accordance with a traveling state of the four-wheel drive vehicle, and
 when the third mode is selected, a first predetermined condition of the predetermined conditions is satisfied, so that the control unit causes the actuator to displace the pressing member with respect to the initial position toward the multi-plate clutch.

4. The drive force transmission apparatus according to claim 1, wherein
 when the control unit determines that the four-wheel drive vehicle is to be switched from the two-wheel drive mode to the four-wheel drive mode, the control unit causes the actuator to displace the pressing member by the displacement amount to engage the four-wheel drive mode.

5. The drive force transmission apparatus according to claim 1, wherein
 when the control unit determines that the four-wheel drive vehicle is to be switched from the two-wheel drive mode to the four-wheel drive mode, the control unit causes the actuator to displace the pressing member from the predetermined amount to the displacement amount to engage the four-wheel drive mode.

6. The drive force transmission apparatus according to claim 1, wherein
 when the control unit determines that the four-wheel drive vehicle is not to be switched from the two-wheel drive mode to the four-wheel drive mode the control unit then determines whether the predetermined condition is satisfied.

* * * * *